United States Patent [19]

Tennutti

[11] Patent Number: 5,232,316
[45] Date of Patent: Aug. 3, 1993

[54] HOB CONSTRUCTION

[75] Inventor: Michael G. Tennutti, McHenry, Ill.

[73] Assignee: Illinois Tool Works Inc., Glenview, Ill.

[21] Appl. No.: 917,932

[22] Filed: Jul. 23, 1992

[51] Int. Cl.⁵ .......................... B23F 21/16; B23C 5/16
[52] U.S. Cl. ........................ 407/23; 407/25; 407/48; 407/118
[58] Field of Search ............... 407/23, 25, 47, 48, 407/51, 52, 56, 118, 119

[56]        References Cited
        U.S. PATENT DOCUMENTS

| | | | |
|---|---|---|---|
| 1,043,831 | 11/1912 | Heinkel et al. | 407/119 |
| 1,090,533 | 3/1914 | Heinkel | 407/56 |
| 1,395,309 | 11/1921 | Taber | 407/52 |
| 2,581,449 | 1/1952 | See | 407/119 |
| 2,758,363 | 8/1956 | Praeg | 407/48 |
| 2,780,858 | 2/1957 | Robinson | 407/47 |
| 3,726,351 | 4/1973 | Williams | 407/119 |

*Primary Examiner*—William E. Terrell
*Attorney, Agent, or Firm*—Schwartz & Weinrieb

[57]            ABSTRACT

A novel hob construction includes a plurality of blades and a cylindrical main body having opposite axial ends. Flanges including axially aligned slots for receiving the blades are located only upon the ends of the main body. A chocking material is provided over the circumferential extent of the main body and between the blades for forming an effective physical extension of the body for bonding the blades to the body and to each other.

20 Claims, 1 Drawing Sheet

HOB CONSTRUCTION

FIELD OF THE INVENTION

The present invention relates to a novel construction for a hob and for insert blade cutters in general. More specifically, the invention relates to a novel hob construction for use with a hobbing machine, such as a rotary gear cutter and the like.

BACKGROUND OF THE INVENTION

The construction and operation of hobs and rotary cutting machines are well known in the relevant art. A typical construction for a hob is disclosed in U.S. Pat. No. 3,175,275 to Zorn. Zorn's hob comprises a substantially cylindrical main tool body having transverse recesses in its external surface substantially extending along the entire axial length of the tool body. Cutter bars or blades are inserted into the recesses with the blades extending from one end of the recesses to the other along the axis of the body. In one embodiment of Zorn's hob, a thin layer of a very high solidity compound is provided between end surfaces of the blades and possibly end surfaces of the body for compensating for any inaccuracies in size and alignment between those surfaces.

Yet another hob construction is disclosed in U.S. Pat. No. 4,023,246 to Haug et al.. Haug's hob also includes a substantially cylindrical main body having axially extending recesses or slots for accepting cutter blades. An adhesive is used to retain the inserted blades within the slots.

The above-discussed hob constructions, which are typical of the prior art, require formation of recesses or slots in the main tool body axially extending substantially along the entire length of the hob. This recess formation can be quite complicated and time consuming. The recesses must be precisely formed in the main body in order to position the cutter blades properly for machining gears and the like as intended. Formation of the recesses, therefore, can be costly in both time and labor.

The present invention is intended to solve the foregoing problems presented by the prior art, and is a significant improvement over those constructions.

OBJECTS OF THE INVENTION

A general object of the present invention is to provide a novel hob construction.

A more specific object of the invention is to provide a novel hob construction which is less expensive and easier to manufacture than other, currently available hobs.

Another object of the present invention is to provide a novel hob construction comprising reusable blades and main bodies.

An additional object of the invention is to provide a novel hob construction having a plurality of removable blades integrally bonded to each other and to a main body.

SUMMARY OF THE INVENTION

A novelly constructed hob, according to the teachings of the present invention, for use with a hobbing machine, such as a rotary gear cutter and the like, comprises a plurality of blades and a cylindrical main body having opposite axial ends. Flanges including axially aligned slots for receiving the blades are disposed only on the ends of the main body. A chocking material is located on the main body and on the blades for forming an effective physical extension of the body for holding the blades.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which.

DETAILED DESCRIPTION OF THE PREFERRED EMBODIMENT

Figure 1:
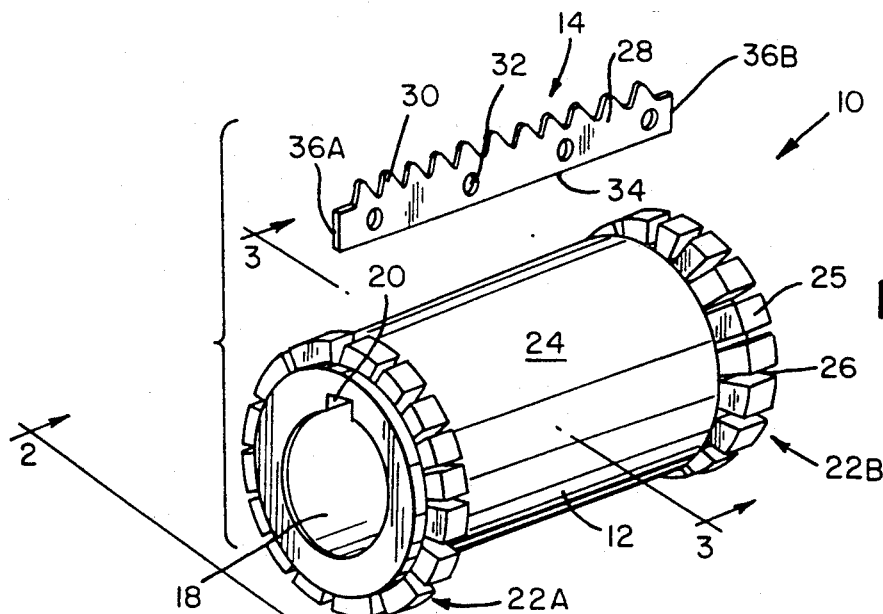
FIG. 1 is an exploded perspective view of a novel hob, constructed according to the teachings of the present invention, showing one blade thereof removed.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 3:
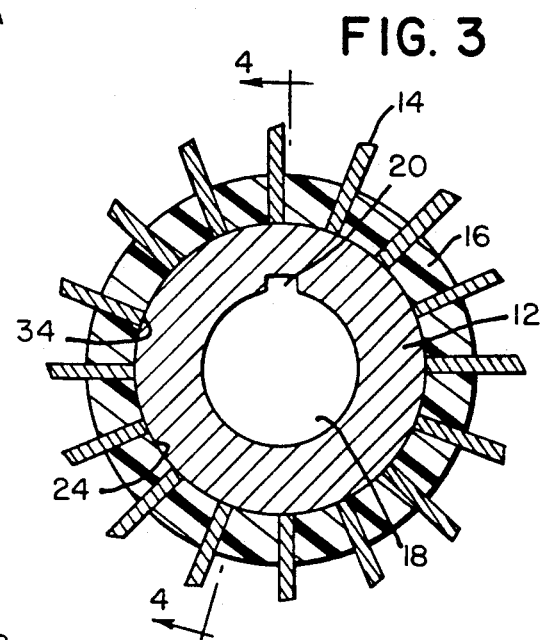
FIG. 3 is an enlarged sectional view, taken along line 3—3 of FIG. 1.

Referring initially to FIGS. 1 and 3, a novel hob 10, constructed according to the teachings of the present invention is illustrated in exploded perspective form. The hob 10 generally comprises three major elements: a cylindrical main body 12, a plurality of cutter blades 14 and a chocking material 16. It is to be noted that, while the invention is discussed hereinbelow with respect to a particularly configured hob 10, the teachings of the invention can be successfully employed with a number of different hob configurations without departing from the scope of the present invention.

In the illustrated embodiment, the main body 12 is in the form of a tube constructed from a suitable material, such as mild steel and the like. Other materials can be utilized depending upon the particular employment of the hob 10. The main body 12 has a smooth and continuous exterior with no pre-formed slots or recesses for receiving blades. The body 12 includes a central axial bore 18 therethrough for accepting a suitable drive shaft (not shown) for applying a torque to the hob 10. To facilitate torque transfer from the drive shaft to the hob 10, the main body 12 inc.udes a drive keyway 20, visible in FIGS. 1-3.

The main body 12 as end flanges 22A and 22B disposed on opposite axial ends thereof. The end flanges 22A and 22B are substantially annular in configuration and extend substantially radially outwardly from a cylindrical surface 24 of the main body 12 on the opposite ends thereof. The flanges 22A and 22B have a plurality of radially extending projections 25 which define a plurality of axially aligned radial slots 26 equal to the number of cutter blades 14 to be employed by the hob 10. The radial slots 26 are dimensioned and axially aligned for accepting and positively locating the blades 14 on the main body 12.

The flanges 22A and 22B can be integral parts of the main body 12 or in the form of washer-like members, separate from the main body 12 which may be removed from the hob 10. The flanges 22A and 22B are intended to maintain the blades 14 in proper position during pouring of the chocking compound 16. Once the chocking compound 16 has been poured and has set up or cured, the flanges 22A and 22B may be removed without affecting the structural integrity of the hob 10.

The slots 26 on the flange 22A are axially aligned with the slots 26 on flange 22B so that blades 14 inserted therein will be retained in a proper disposition for hobbing parallel to the axis of elongation of the main body 12. Flanges 22A and 22B and the associated slots 26 have a minor thickness compared to the axial length of the main body 12. Because the effective length of slots or recesses which must be machined on the flanges 22A and 22B is substantially reduced, the process of manufacturing the hob 10 is simpler than the processes of manufacturing many of the prior art hobs.

Figure 2:
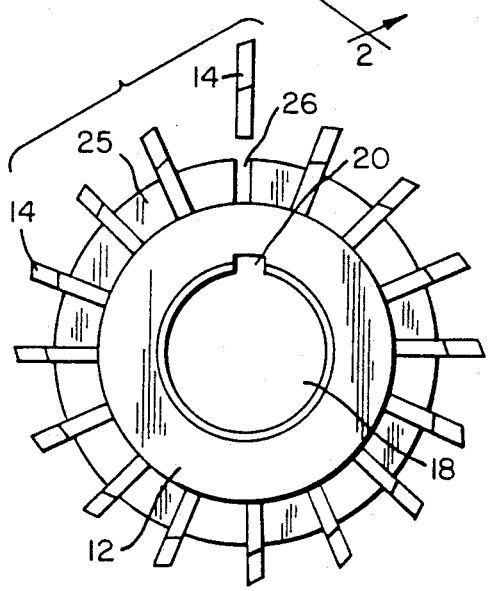
FIG. 2 is an end elevational view, taken along line 2—2 of FIG. 1.
Figure 4:
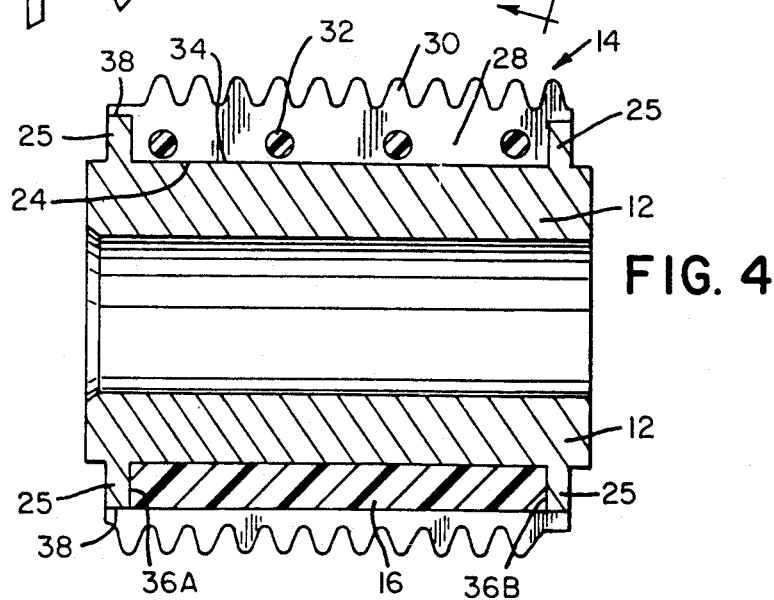
FIG. 4 is a sectional view taken along line 4—4 Of FIG. 3.

The construction of the blades 14 is illustrated in FIGS. 1 and 4, and the blades 14 may be constructed of any suitable material, such as high strength steel and the like. The hob 10 includes sixteen blades 14 and slots 26 disposed equidistantly around the circumference of the body 12, although a greater or lesser number of blades 14 and slots 26 can be used. The blades 14 are substantially planar in configuration comprising base portions 28 and a plurality of cutter teeth 30 extending from the portions 28. The depth of the base portions 28 is greater than the radial length of the projections 25 from the terminal ends thereof to the surface 24. Thus, the teeth 30 are offset upwardly from the terminal ends of the projections 25 when the blades 14 are inserted into the slots 26. Edges 34 of the base portions 28 opposite to the side thereof adjacent the teeth 30 are constructed for butting engagement with the surface 24 when the blades 14 are properly positioned in the slots 26, as shown in FIGS. 2 through 4. The thickness of each base portion 28 is essentially the same as the width of the slots 26 so that the base portions 28 will fit tightly within the slots 26. A plurality of apertures 32 extend through the base portions 28 above the edges 34 for accepting the chocking material 16, as will be discussed further herein.

The chocking material 16 is added to the spaces between adjacent blades 14 after the blades 14 have been inserted into the slots 26. The chocking material 16 is a strong, rigid adhesive polymer. A preferred chocking material is sold under the name SILVER SUPER ALLOY ™ by Philadelphia Resins, an ITW company. The chocking material 16 is not intended to be a tolerance compensator, but actually forms a physical link between the body 12 and the blades 14. Specifically, the chocking material 16 flows on top of the surface 24 between adjacent blades 14 and through the apertures 32 in the blades 14, and bonds to all of those elements. Thus, the material 16 forms an integrally joined physical extension of the main body 12 and integrally bonds the blades 14 to each other and to the main body 12 throughout their entire lengths without the need of machining axially extending recesses along the main body 12, as required by the prior art hob constructions. In this manner, the hob 10 provides the same structural benefits supplied by the hob constructions of the prior art, but because axially extending radial slots do not have to be machined on the main body 12, the hob 10 is relatively easier to manufacture as compared to the prior art hobs.

With the structural elements of the hob 10 being discussed hereinabove, the manufacturing process thereof will now be disclosed in detail. It is to be understood that further structural limitations and requirements of the hob 10 and its elements may become more clear with reference to the following discussion.

First, the main body 12 is constructed by well-known metallurgical procedures, such as casting and the like. Then the flanges 22A and 22B are either integrally cast with the main body 12, or cast separately from the main body 12, in which case, the main body 12 remains cylindrically smooth and continuous.

If the flanges 22A and 22B are cast separate from the main body 12, then those flanges 22A and 22B can now be properly positioned on the main body 12 on the opposite axial ends thereof. The blades 14 are inserted into the slots 26 in the flanges 22A and 22B. When the blades 14 are properly inserted into the slots 26, the sides 34 abut the surface 24, and end portions 36A and 36B of the blades 14 are aligned with the projections 25, as shown in FIGS. 1 and 4. When all of the blades 14 are properly positioned in the slots 26, the chocking compound 16 can be poured between adjacent blades 14 by appropriate means. A mold of sorts can be constructed which holds the blades 14 in proper position with respect to the main body 12 during pouring of the chocking material 16. If this is done, then the end flanges 22A and 22B are not needed and may be eliminated altogether.

The chocking material 16 is poured into the spaces between adjacent blades 14, and flows over the surface 24 and through the apertures 32. Chocking material 16 is added until the level thereof is equal to an outer diameter 38 of the body 12 defined by the terminal ends of the projections 25. As the chocking material 16 sets or cures, the chocking material 16 bonds to the surface 24 and to the main body 12. The chocking material 16 thusly forms an effective integral physical extension of the main body 12. The material 16 which resides in the apertures 32 forms an integral link between adjacent blades 14 and also between the blades 14 and the body 12. Once the chocking material 16 has set, the flanges 22A and 22B, if used, can be removed by appropriate means. The hob 10 is now ready for use. It is to be noted that the chocking material 16 may be removed at a later date by appropriate means, thereby allowing recycling of the main body 12 as well as replacement of worn blades 14. The tight fit between the edges of the slots 26 and the blades 14 effectively precludes entry of the adhesive chocking material 16 between these edges and opposing faces or sides of the blades 14 for facilitating removal of the blades once the chocking material 16 has been routed or otherwise removed from between the blades 14.

The hob 10 of the present invention provides a number of significant benefits as compared with the hobs of the prior art. Because axially extending recesses or slots do not have to be machined along the length of the main body 12, the hob 10 is easier and less expensive to manufacture than some of the prior art hobs. The blades 14 are integrally bonded to each other, as well as to the main body 12, thereby providing the hob 10 with significant structural integrity. Because the chocking material 16 may be removed, the body 12 and the blades 14 can be recycled. Furthermore, because the body 12 and the blades 14 are constructed separately, a plurality of suitable materials can be used, thereby tailoring a hob 10 to a particular utilization.

While a preferred embodiment of the present invention is shown and described, it is envisioned that those skilled in the art may devise various modifications of the present invention without departing from the spirit and scope of the appended claims. It is therefore to be understood that within the scope of the appended claims, the present invention may be practiced otherwise than as specifically described herein.

The invention claimed is:

1. A hob for a hobbing machine, comprising:
   a cylindrical main body having a predetermined length and a circumferentially extending, non-slotted cylindrical surface;
   a plurality of blades separate from said cylindrical main body and disposed upon said cylindrical main body such that radially inner edge portions of said blades abut said non-slotted cylindrical surface of said cylindrical main body;
   flange means disposed upon opposite ends of said cylindrical main body and having a plurality of slots defined therein for receiving said plurality of blades therein, said flange means having a minor axial thickness as compared to the axial length of said cylindrical main body; and
   chocking material disposed about said cylindrical main body and interposed between said plurality of blades so as to be solidified in place upon said cylindrical main body and between said plurality of blades for bonding said blades to said cylindrical main body, and for bonding said blades to each other.

2. A hob as defined in claim 1 wherein said flange means are integral with said main body.

3. A hob as defined in claim 1, wherein:
   said flange means are removable from said cylindrical main body once said chocking material has solidified upon said cylindrical main body and between said plurality of blades.

4. A hob as defined in claim 1, wherein:
   said chocking material is removable from said cylindrical main body and from between said plurality of blades for allowing removal of said plurality of blades from said slots of said flange means.

5. A hob as defined in claim 1 further comprising at least one aperture disposed on at least one of the blades for accepting chocking material therethrough for interlocking said at least one of the blades with other blades.

6. A hob as defined in claim 1 wherein a tight fit exists between edges of said slots and said blades effectively excluding entry of the chocking material between said edges and said blades.

7. A hob as set forth in claim 1, wherein:
   said flange means have a predetermined radial depth extending radially outwardly from said cylindrical surface of said cylindrical main body; and
   said chocking material has a predetermined radial depth which is substantially equal to said predetermined radial depth of said flange means.

8. A hob for a hobbing machine, comprising:
   a cylindrical main body having a smooth, circumferentially continuous cylindrical surface;
   a plurality of circumferentially spaced, axially extending blades separate from said cylindrical main body and disposed upon said cylindrical main body such that radially inner edge portions of said plurality of blades abut said smooth, circumferentially continuous cylindrical surface; and
   adhesive chocking material disposed about said cylindrical main body and interposed between said plurality of blades so as to be solidified in place upon said cylindrical main body and between said plurality of blades for bonding said blades to said cylindrical main body, and for bonding said blades to each other.

9. A hob set forth in claim 8, further comprising:
   flange means disposed upon opposite ends of said cylindrical main body and having a plurality of slots defined therein for receiving said plurality of blades therein, said flange means having an axial thickness which is substantially less than the axial length of said cylindrical main body.

10. A hob as set forth in claim 9, wherein:
    said flange means are removable from said cylindrical main body once said chocking material has bonded said plurality of blades to said cylindrical main body and to each other.

11. A hob as set forth in claim 9, wherein:
    said flange means are integral with said cylindrical main body.

12. A hob as set forth in claim 9, wherein:
    said chocking material is removable from said cylindrical main body and from between said plurality of blades so as to permit removal of said plurality of blades from said slots of said flange means.

13. A hob as set forth in claim 9, wherein:
    a tight fit is defined between said slots of said flange means and said plurality of blades so as to effectively exclude entry of said adhesive chocking material between said plurality of blades and said flange means.

14. A hob as set forth in claim 9, wherein:
    said flange means have a predetermined radial depth extending radially outwardly from said cylindrical surface of said cylindrical main body; and
    said adhesive chocking material has a predetermined radial depth which is substantially equal to said predetermined radial depth of said flange means.

15. A hob as set forth in claim 8, wherein:
    each one of said plurality of blades has aperture means defined therein for permitting said adhesive chocking material to flow therethrough prior to said solidification of said adhesive chocking material such that upon solidification of said adhesive chocking material, said plurality of blades are interlockingly bonded to each other.

16. A hob for a hobbing machine, comprising:
    a cylindrical main body having a predetermined axial length and a circumferential extent;
    a plurality of circumferentially spaced, axially extending blades separate from said cylindrical main body and disposed upon said cylindrical main body;
    flange means disposed upon opposite ends of said cylindrical main body and having a plurality of slots defined therein for receiving said plurality of blades therein, said flange means having an axial thickness which is substantially less than the axial length of said cylindrical main body;
    aperture means defined within said plurality of blades; and
    adhesive chocking material disposed about said cylindrical main body, interposed between said plurality of blades, and passing through said aperture means of said plurality of blades for bonding said plurality of blades to said cylindrical main body, for bonding said plurality of blades to each other, and for mechanically interlocking said plurality of blades to each other upon solidification of said adhesive chocking material upon said cylindrical main body and between said plurality of blades.

17. A hob as set forth in claim 16, wherein:
said flange means are integral with said cylindrical main body.

18. A hob as set forth in claim 16, wherein:
said flange means are removable from said cylindrical main body once said adhesive chocking material has solidified upon said cylindrical main body and between said plurality of blades.

19. A hob as set forth in claim 16, wherein:
said adhesive chocking material is removable from said cylindrical main body and from between said plurality of blades so as to permit removal of said plurality of blades from said slots of said flange means.

20. A hob as set forth in claim 16, wherein:
a tight fit is defined between said slots of said flange means and said plurality of blades so as to effectively exclude entry of said adhesive chocking material between said plurality of blades and said flange means.

* * * * *